United States Patent [19]

Knight

[11] Patent Number: 4,820,096

[45] Date of Patent: Apr. 11, 1989

[54] NUT APPARATUS

[75] Inventor: Michael R. Knight, Irving, Tex.

[73] Assignee: Dal-Tex Specialty & Mfg. Co., Dallas, Tex.

[21] Appl. No.: 95,911

[22] Filed: Sep. 14, 1987

[51] Int. Cl.$^4$ .............................................. F16B 39/28
[52] U.S. Cl. .................................... 411/169; 4/234; 4/237; 411/402; 411/427; 411/435; 411/908
[58] Field of Search ............... 411/435, 427, 166, 908, 411/169, 973, 172, 174, 175, 1-5, 402, 96, 984; 4/236–237, 234, 240

[56] References Cited

U.S. PATENT DOCUMENTS

| | | | |
|---|---|---|---|
| 200,013 | 2/1878 | Allen | 411/169 X |
| 404,326 | 5/1889 | Vinyard | 411/96 |
| 469,613 | 2/1892 | Vinyard | 411/96 |
| 1,431,832 | 10/1922 | Mills et al. | |
| 1,616,437 | 2/1927 | Brock | 411/81 X |
| 1,985,272 | 12/1934 | Adams | 411/955 X |
| 2,335,593 | 11/1943 | Howe | 411/166 |
| 2,513,037 | 6/1950 | McLaughlin | 411/166 |
| 2,784,759 | 3/1957 | Modrey | 411/408 |
| 3,551,922 | 1/1971 | Watson | 4/240 |
| 3,878,758 | 4/1975 | Reed | 411/427 |
| 4,309,780 | 1/1982 | Fantetti | 4/240 X |
| 4,319,365 | 3/1982 | Bemis et al. | 4/240 X |
| 4,326,307 | 4/1982 | Baillie et al. | 4/236 |
| 4,467,481 | 8/1984 | Ginsburg | 4/240 |

FOREIGN PATENT DOCUMENTS 2718562 11/1978 Fed. Rep. of Germany ...... 411/435
1003122 11/1951 France ................................ 411/435

Primary Examiner—Lloyd A. Gall
Assistant Examiner—Curtis B. Brueske
Attorney, Agent, or Firm—Arthur F. Zobal

[57] ABSTRACT

The nut apparatus is formed by a body member having two ends with a threaded aperture extending therethrough between the two ends for receiving the threaded shank of a bolt or the like. The body member has a tapered portion at one end for partial insertion into an aperture formed through the structure of the toilet through which the bolt is to extend. An arm extends from the body member at a position between the base of the tapered portion and the other of the two ends of the body member transversely to the axis of the threaded aperture for engaging structure of the toilet to hold the body member stationary while the bolt is screwed into the threaded aperture or unscrewed from the threaded aperture. The body member, the tapered portion, and the arm are integral with each other and are formed of a suitable soft plastic material. A scored line extends across the width of the arm to facilitate breaking of the arm at the scored line to shorten the arm if desired.

2 Claims, 2 Drawing Sheets

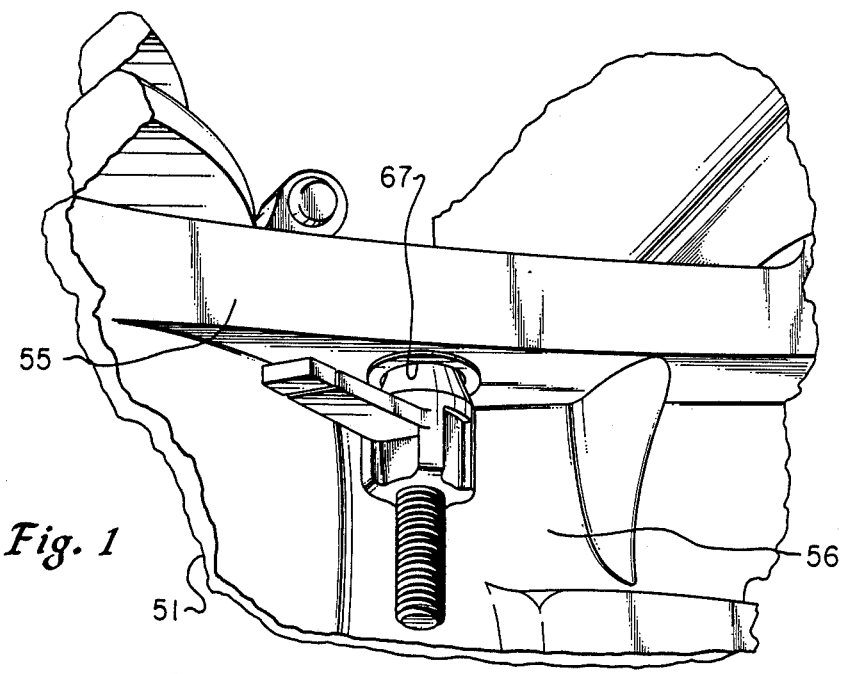
Fig. 1
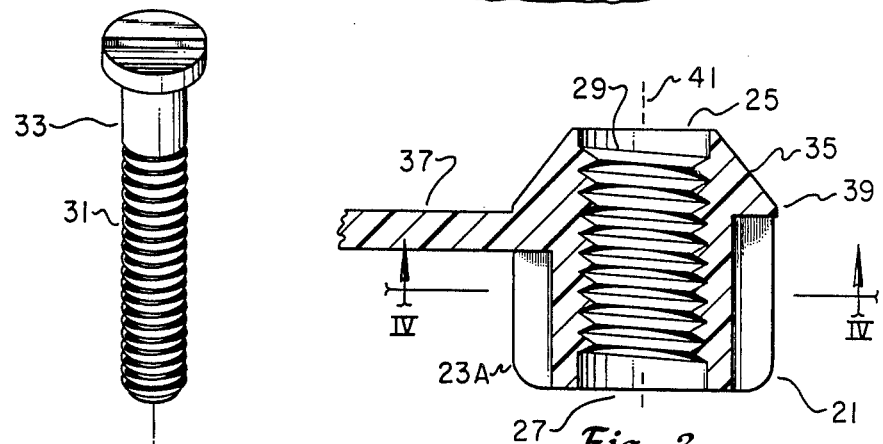
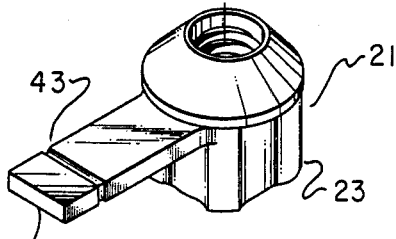
Fig. 2
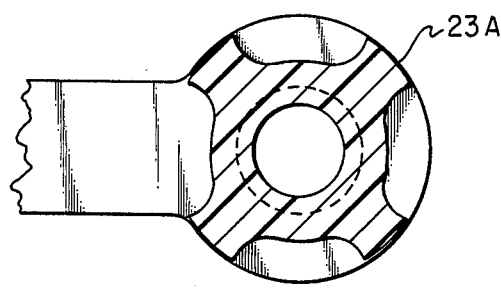
Fig. 3
Fig. 4

NUT APPARATUS

BACKGROUND OF THE INVENTION

Conventionally, a toilet seat is secured to a toilet by extending bolts through apertures formed through the rear hinges of the seat from the top side and through apertures formed through rear flange structure of the toilet. The bolts then are screwed into nuts located below the flange structure of the toilet. This is an inconvenient operation and requires the installer to manually hold the nut while the bolt is screwed into the nut to a tightened position. Separate cone shaped washers or spacers sometimes are located around the shank of the bolt between the nut and the bottom side of the flange structure of the toilet for partial insertion into the holes of the flange structure for cushioning purposes and to facilitate tightening regardless of the hole size.

SUMMARY OF THE INVENTION

It is an object of the invention to provide a nut apparatus for use for attaching a toilet seat to a toilet which makes installation easier and which can be used for different sized holes and toilets of different structure.

The nut apparatus comprises a body member having two ends with a threaded aperture extending through said body member between said two ends for receiving the threaded shank of a bolt or the like. One end of the body member is tapered for partial insertion into an aperture formed through the structure of the toilet through which the bolt is to extend. Arm means extends from said nut body at a position between the base of the tapered portion and the other of said two ends transversely to the axis of said threaded aperture for engaging structure of the toilet to hold said body member stationary while the bolt is screwed into said threaded aperture or unscrewed from said threaded aperture of said body member.

In a further aspect, said body member, said tapered portion and said arm means are integral with each other and are formed of a plastic material. A scored line extends across the width of said arm means to facilitate breaking of said arm means to shorten said arm means, if desired.

BRIEF DESCRIPTION OF THE DRAWINGS

FIG. 1 illustrates the partial underside of a toilet with the nut apparatus of the invention having a bolt screwed therethrough for holding a toilet seat in place.

FIG. 2 is an isometric view of the nut apparatus of the invention with a bolt to be screwed into the threaded aperture of the nut apparatus.

FIG. 3 is a cross-sectional view of the nut apparatus of the invention.

FIG. 4 is a cross-section of FIG. 3 taken along the lines 4—4 thereof.

DESCRIPTION OF THE PREFERRED EMBODIMENT

Figure 5:
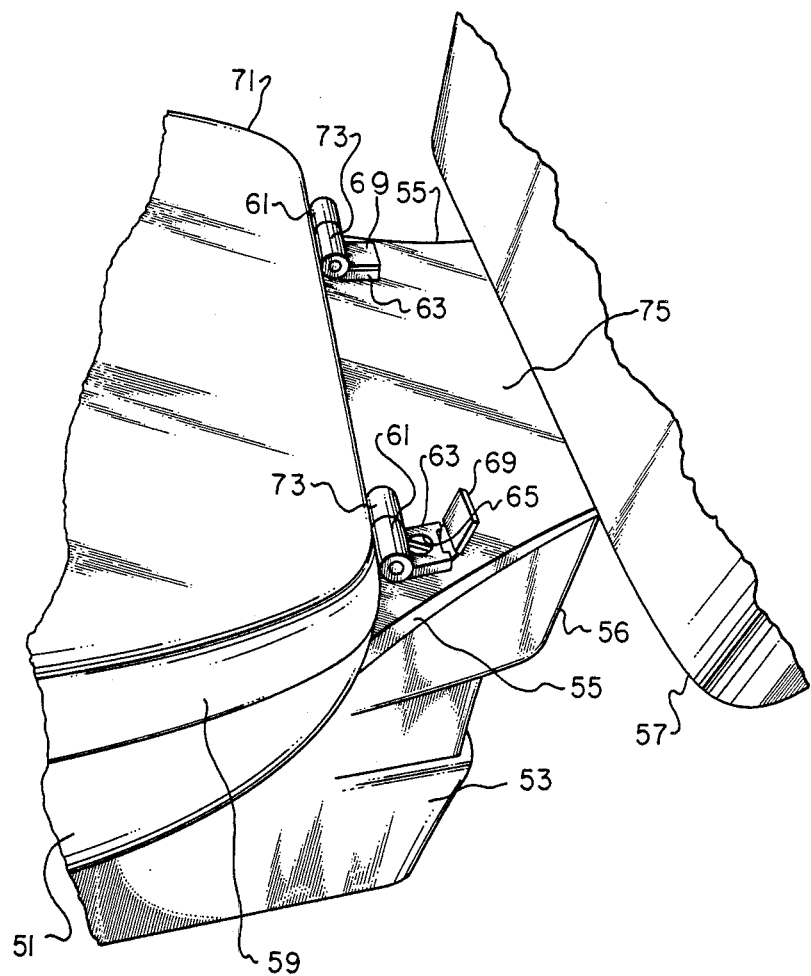
FIG. 5 is a partial view of the top rear portion of a toilet illustrating an aperture formed through a hinge of a toilet seat.

Referring to the drawings, the nut apparatus of the invention is identified by reference number 21. It comprises a body member 23 having two ends 25 and 27 with a threaded aperture 29 extending through said body member between the two ends for receiving the threaded shank 31 of a bolt 33. The body member 23 has a tapered or cone shaped portion 35 which tapers from a base position 39 toward the end 25 for partial insertion into an aperture formed through the structure of the toilet through which the bolt is to extend. The base position 39 is close to but spaced from the end 25. An arm 37 extends from the body member at a position between the base position 39 and the end 27 transversely to the axis 41 of the threaded aperture 29 for engaging structure of the toilet to hold the nut body stationary while the bolt is screwed into the threaded aperture or unscrewed from the threaded aperture 29. The body member 21, the tapered portion 35, and the arm 37 are integral with each other and are formed from a suitable soft plastic, such as polypropolyne. The arm 37 has a scored line 43 formed across its width and, in the preferred embodiment, completely around the arm 37 near its end 37A, such that the portion of the arm between the scored line 43 and its end 37A may be readily broken off to shorten the arm depending upon the structure of the toilet. The body member 23 has strengthening ribs 23A which extend from the base portion 39 to the end 27.

The manner in which the nut apparatus 21 is used for connecting a toilet eat to a toilet now will be described. In FIGS. 1 and 5, reference numeral 51 identifies the structure of the toilet which forms the bowl. The base of the toilet is shown at 53. Rear flange structure 55 extends between the bowl on each side of the toilet to rear structure 56. The water container is shown at 57. Member 59 is the seat of the toilet having hinges 61 to be connected to the flanges 55 by way of hinge base members 63 each of which has an aperture 65 extending therethrough which is aligned with an aperture 67 formed through the flange 55. Member 69 is a cap which closes to hide the top of the connecting bolt 33. Member 71 is the lid or cover of the toilet seat which is hinged to the members 63 by way of hinges 73. The toilet seat is located on the top 75 of the toilet such that the apertures 65 are aligned with the apertures 67 formed through the flanges 55. The lids 69 are opened and the bolts 33 are inserted through the apertures 65 of the members 63 of the hinges 61 and through the apertures 67 of the flanges 55. Each nut apparatus then is located manually by the installer on the underside of the flanges 55 with its tapered portion 35 located next to the aperture 65. The threaded shank 31 of each of the bolts 33 is screwed into the threaded aperture 29 of each of the nut apparatuses 21 while held by the installer until threaded engagement is made. This procedure is carried out separately for each nut apparatus-bolt pair. The installer then may release the nut apparatus 21 and screw the bolt 33 tightly into its aperture 29. In this operation, the nut apparatus 21 will rotate until its arm 37 engages the bowl structure 51 as shown in FIG. 1 which holds the nut apparatus stationary while the bolt 33 is screwed through the threaded aperture 29. As the bolt 33 is screwed in place to the nut apparatus 21, the tapered portion 35 is moved upward partially into the aperture 67 of the flange to form a cushion and to adjust for the size of the aperture 67. When it is desired to unscrew a bolt 33 from the nut apparatus 21, the bolt is unscrewed in the opposite direction. When this occurs, the nut apparatus 21 will rotate in an opposite direction from that shown in FIG. 1 until its arm 37 engages the base structure 56 of the toilet at which point the nut will be held in a stationary position while the bolt is unscrewed. Different toilets have different structural components and sizes and in some cases, it may be desired to shorten the arm 37 which can be done by breaking the end portion 37A of the arm off at the scored line 43. Preferably, the bolt 33 will be formed of a soft plastic material such as polypropolyne.

I claim:

1. A nut apparatus for use for securing a toilet seat to a toilet, comprising:

a body member having two ends with a threaded aperture extending through said body member between said two ends for receiving the threaded shank of a bolt or the like, said body member having a tapered portion which tapers from a base position toward one of said two ends, said base position being spaced from said one end, a single arm means extending from said body member at a position between said base position and the other of said two ends transversely to the axis of said threaded aperture for engaging structure of the toilet to hold said nut body stationary while the bolt is screwed into said threaded aperture or unscrewed from said threaded aperture of said body member, said body member, said tapered portion, and said arm means being integral with each other and being formed of a plastic material, said arm means having a free end spaced from said body member, and a scored line extending across the width of said arm means to facilitate breaking of said arm means to shorten said arm means if desired, said scored line being located between said free end and said body member and being spaced from said body member.

2. The nut apparatus of claim 1, wherein:

said scored line is located closer to said free end of said arm means than to said body member.

* * * * *